United States Patent [19]

Rinderer

[11] Patent Number: 4,971,280
[45] Date of Patent: Nov. 20, 1990

[54] CLIP FOR MOUNTING OBJECTS ON A WALL STUD

[75] Inventor: Eric R. Rinderer, Highland, Ill.

[73] Assignee: B-Line Systems, Inc., Highland, Ill.

[21] Appl. No.: 388,652

[22] Filed: Aug. 1, 1989

[51] Int. Cl.$^5$ .............................................. A47B 96/06
[52] U.S. Cl. ................................ 248/229; 248/231.8; 248/906
[58] Field of Search .................... 248/229, 225.31, 228, 248/231.8, 316.5, 205.1, 906, 27.1, 201; 174/58; 220/3.9, 3.92

[56] References Cited

U.S. PATENT DOCUMENTS

| | | | |
|---|---|---|---|
| 3,040,739 | 6/1962 | Grieshaber | 248/229 X |
| 3,053,494 | 9/1962 | Stoll | 248/228 |
| 3,122,604 | 2/1964 | Cook et al. | 174/51 |
| 3,131,447 | 5/1964 | Tinnerman | 24/81 |
| 3,528,636 | 9/1970 | Schmidt | 248/205 |
| 3,536,281 | 10/1970 | Meehan et al. | 248/73 |
| 3,588,019 | 6/1971 | Cozeck | 248/228 |
| 3,606,223 | 9/1971 | Havener | 248/205 |
| 3,684,230 | 8/1972 | Swanquist | 248/229 |
| 3,720,395 | 3/1973 | Schuplin | 248/265 |
| 3,765,633 | 10/1973 | Caudill | 248/229 |
| 3,780,209 | 12/1973 | Schuplin | 174/51 |
| 3,804,359 | 4/1974 | Cumber | 248/205 |

Primary Examiner—Ramon O. Ramirez
Attorney, Agent, or Firm—Senniger, Powers, Leavitt & Roedel

[57] ABSTRACT

A clip for mounting an object such as an electrical box on a metal stud of generally channel shape having a web and a pair of generally parallel flanges. The clip includes a first clip part engageable with the stud for securement of the clip to the stud. The first pair has a relatively flat leg. A second clip part holds the object and has a relatively flat leg extending in generally parallel face-to-face relation with the leg of the first clip part. The leg of the second clip part is slidable relative to the leg of the first clip part lengthwise of the leg of the first clip part for adjusting the position of the object being held by the second clip part relative to the stud. Flanges define a guideway for maintaining the leg of the second clip part in longitudinal alignment with the leg of the first clip part as the leg of the second clip part is slidably adjusted relative to the leg of the first clip part. Detents on the leg of one of the clip parts are receivable in notches on the leg of the other clip part for locking the leg of the second clip part in selected positions of lengthwise adjustment relative to the leg of the first clip part.

8 Claims, 3 Drawing Sheets

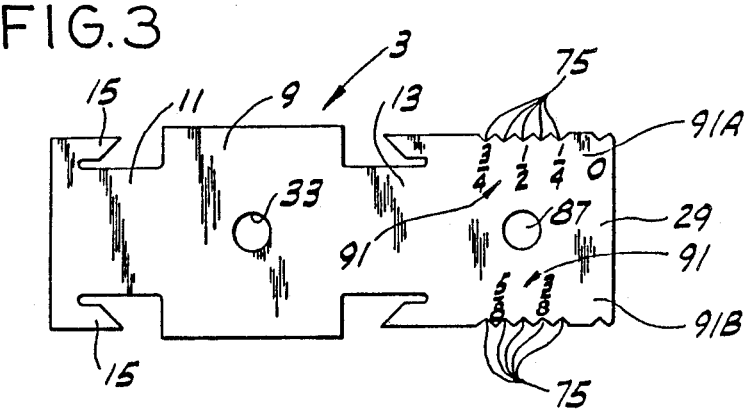
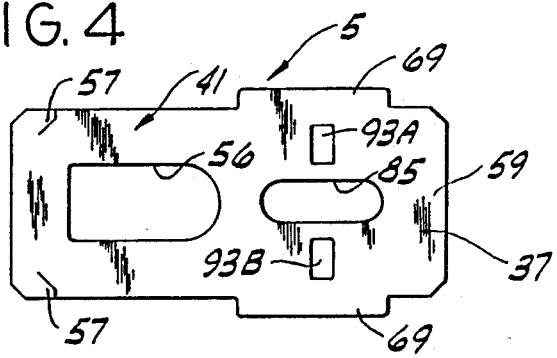
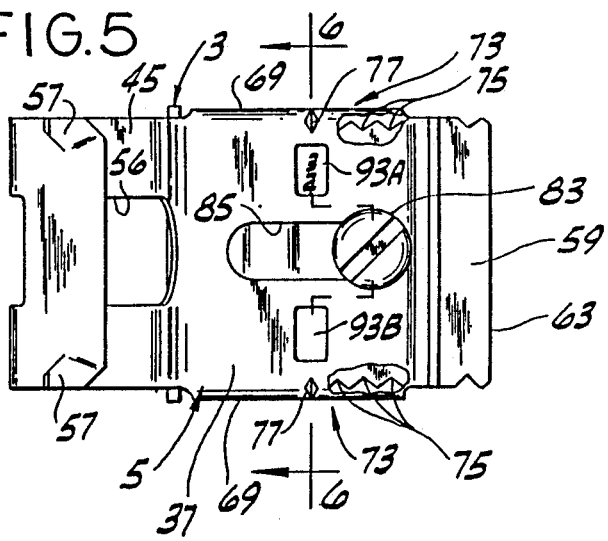

CLIP FOR MOUNTING OBJECTS ON A WALL STUD

BACKGROUND OF THE INVENTION

This invention relates generally to devices for mounting equipment on wall studs and, more particularly, to a sheet metal clip for adjustably mounting electrical boxes and other objects on metal wall studs.

In mounting electrical boxes and switch boxes on metal studs, it is desirable to be able to adjust the position of the box according to the thickness of drywall being used (e.g., ¼", ⅜", ½", etc.). Various mounting clips have been developed for this purpose, but all have various disadvantages.

SUMMARY OF THE INVENTION

Among the several objects of this invention may be noted the provision of an improved mounting clip for mounting electrical boxes and the like on a metal wall stud; the provision of such a clip which is readily adjustable to accommodate drywall of different thicknesses; the provision of such a clip where the proper position of adjustment for a drywall of particular thickness is easily determined without risk of error; the provision of such a clip which is easy to handle; and the provision of such a clip which is of economical manufacture.

A clip of this invention is used for mounting an object such as an electrical box on a metal stud of generally channel shape having a web and a pair of generally parallel flanges. Generally, the clip comprises a first clip part engageable with the stud for securement of the clip to the stud, and having a relatively flat leg. A second clip part is adapted to hold the object to be mounted and has a relatively flat leg extending in generally parallel face-to-face relation with the leg of the first clip part. The leg of the second clip part is slidable relative to the leg of the first clip part lengthwise of the leg of the first clip part for adjusting the position of the object being held by the second clip part relative to the stud. The clip further includes means for maintaining the leg of the second clip part in longitudinal alignment with the leg of the first clip part as the leg of the second clip part is slidably adjusted relative to the leg of the first clip part. Cooperable detent means on the legs of the first and second clip parts locks the leg of the second clip part in selected positions of lengthwise adjustment relative to the leg of the first clip part.

Other objects and features will be in part apparent and in part pointed out hereinafter.

BRIEF DESCRIPTION OF THE DRAWINGS

FIG. 3 is a view of the first clip part in flat configuration before forming;

FIG. 4 is a view of the second clip part in flat configuration before forming;

FIG. 5 is a side elevation of the first and second clip parts in assembly, portions of the second clip part being broken away to illustrate details;

Corresponding parts are designated by corresponding reference numerals in the several views of the drawings.

DESCRIPTION OF THE PREFERRED EMBODIMENT

Figure 1:
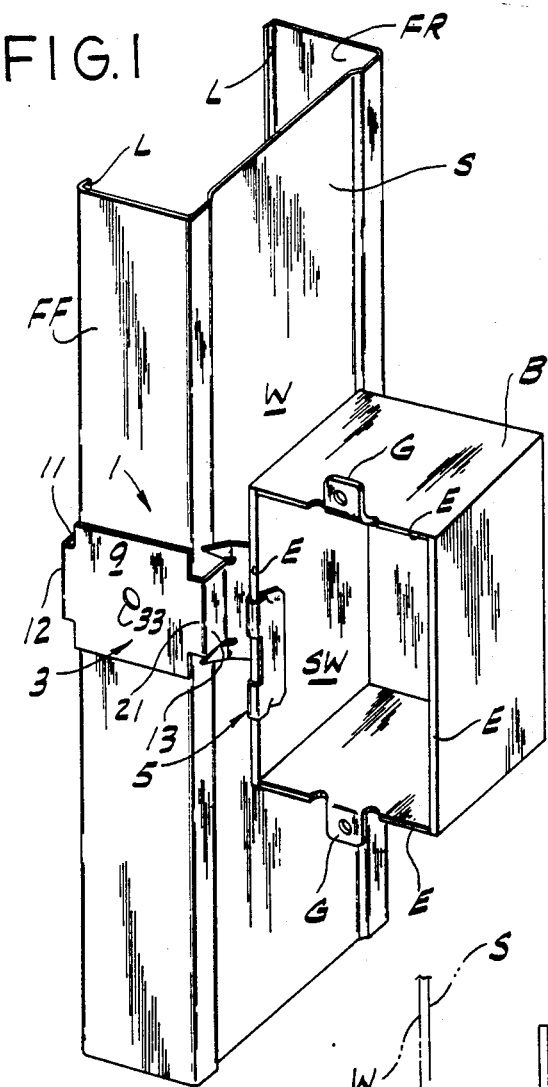
FIG. 1 is a perspective view of a clip of this invention shown mounting an electrical box on a metal stud.

Referring now to the drawings, there is generally indicated at 1 a clip for mounting an object such as an electrical box B on a metal stud S. The stud S illustrated in the drawings is a metal stud of generally channel shape having a web W at one side of the stud, and generally parallel opposing flanges extending laterally outwardly from the web, one flange FF constituting a front flange at the front of the stud and the other flange FR constituting a rear flange at the rear of the stud. Inwardly turned lips L are located at the outer edges of the flanges. While a metal stud is shown in the drawings, it will be understood that the mounting clip 1 of the present invention is also adapted for use with a conventional wood stud of rectangular cross section. The clip 1 comprises a first clip part and a second clip part generally indicated at 3 and 5, respectively. For economical manufacture, the first clip part 3 (FIG. 3) and the second clip part 5 (FIG. 4) may be stamped individually from flat sheet metal blank, then formed as required and assembled. As shown in FIG. 1, the first clip part 3 is engageable with the front flange FF of the stud S for securing the clip 1 to the stud. The second clip part 5 holds the electrical box B to be mounted on the stud S.

The first clip part 3 includes a middle portion 9, a first side portion 11 and a second side portion 13. The first side portion 11 extends generally upwardly, as viewed in FIG. 2, from the left edge 12 of the middle portion 9. A first pair of prongs 15 extend downwardly from the distal end of the first side portion 11 and terminate at pointed tips 17. The prongs 15 are bent so that they also project inwardly with respect to the middle portion 9. The second side portion 13 extends generally upwardly, as viewed in FIG. 2, from the right edge 21 of the middle portion 9. The second side portion 13 is bent outwardly, and a second pair of prongs 25 project downwardly and inwardly from the distal end of the second side portion 13 and terminate at pointed tips 27. A relatively flat leg 29 extends upwardly from the top edge 30 of the second side portion 13.

The lateral separation of the tips 17, 27 of the first and second pairs of prongs 15, 25 is less than the lateral width of the stud S so that the pointed tips 17 of the first pair of prongs 15 are engageable with the forwardmost lip L and the pointed tips 27 of the second pair of prongs 25 are engageable with the web W so that the prongs 15, 25 grip the stud S to clip the first clip part 3 onto the front flange FF for securing the mounting clip 1 to the stud. The mounting clip 1 may be further secured to the stud S by a fastener (not shown) such as a nail or screw received through a hole 33 in the middle portion 9 of the first clip part 3 and piercing the front flange FF.

Figure 2:
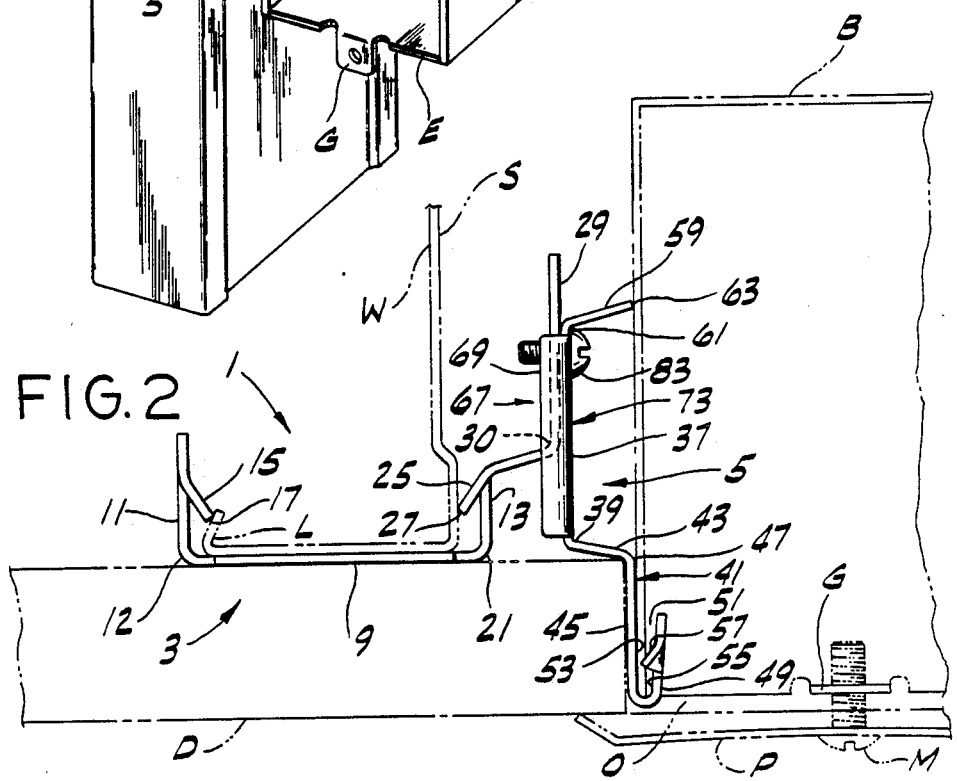
FIG. 2 is a top plan view of the clip of FIG. 1 showing the clip as comprising first and second clip parts.

The second clip part 5 comprises a relatively flat leg 37 which, as seen in FIG. 2, extends in a generally vertically oriented plane substantially parallel to the leg 29 of the first clip part 3. Extending downwardly from the bottom edge 39 of the leg 37 is a box clip arm, generally indicated at 41. The clip arm 41 includes an angled portion 43 projecting downwardly and laterally outwardly from the bottom edge 39 of the leg, and a clip portion 45 extending downwardly from a lower edge 47 of the angled portion in a plane generally parallel to the plane of the leg 37. The lower end 49 of the clip portion 45, as seen in FIG. 2, curves back upon itself to form a horizontally extending, upwardly opening channel 51 having an inner wall 53 and an outer wall 55. An elongate opening 56 in the clip arm 41, as best seen in the flat configuration of the second clip part 5 (FIG. 4), facilitates forming of the clip portion 45 of the clip arm and reduces the weight of the second clip part. The channel 51 is adapted to receive a front edge E of a side wall SW of the electrical box B (FIG. 1). A third pair of prongs 57 having pointed tips project inwardly and downwardly, as viewed in FIG. 2, from the side edges of the outer wall 55 of the channel 51. The separation of these tips of the prongs 57 and the inner wall 53 of the channel 51 is less than the thickness of the side wall SW of the electrical box B so that the tips of the prongs 57 resiliently engage the side wall SW of the electrical box B when it is received in the channel for securing the box in fixed position to the second clip part 5. A support member 59 projects generally outwardly from the top edge 61 of the leg 37 of the second clip part 5. The outer edge 63 of the support member 59 is generally in the same plane as the inner wall 53 of the clip portion channel 51. When the clip 1 is attached to the stud S and the electrical box B is clipped onto the second clip part 5 as shown in FIG. 1, the support member 59 engages the side wall SW of the electrical box B near its rear for supporting the rear of the box against laterally inward movement.

As best illustrated in FIG. 2, when the two clip parts 3,5 are assembled, the leg 37 of the second clip part 5 is in generally parallel, face-to-face relation with the leg 29 of the first clip part 3. The leg 37 of the second clip part 5 is slidable relative to the leg 29 of the first clip part 3 lengthwise of the leg of the first clip part for adjusting the position of the electrical box B held by the second clip part in front-to-rear direction relative to the stud S. The electrical box B may thus be adjusted according to the thickness of the drywall D mounted on the stud S, so that the front of the electrical box is immediately adjacent the front of an opening O in the drywall. It should be noted in this regard that it is important that the front of the electrical box B be slightly recessed into the drywall D a distance such that a cover plate P fastened to the box lies flush with the front of the drywall. The recessed position of the front of the electrical box B allows the mounting screws M of the cover plate P to flex the cover plate slightly inwardly into the opening ) when the cover plate is mounted on the box so that the cover plate is held securely against the drywall D. Because the thickness of drywall varies, it is necessary to adjust the position of the electrical box in front-to-rear direction to ensure a proper fit of the cover plate P on the drywall.

Figure 6:
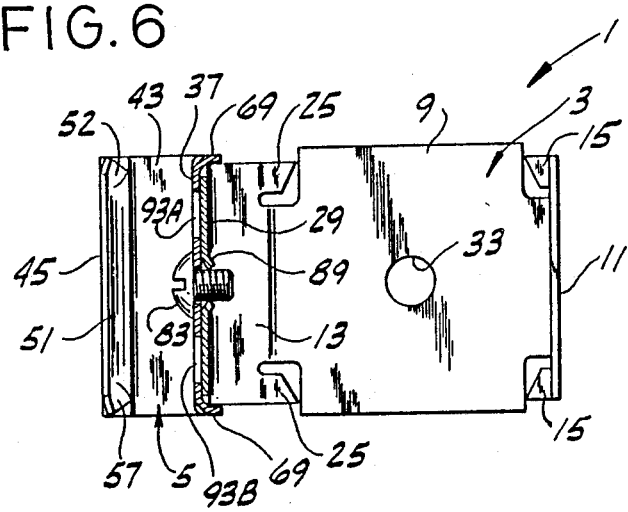
FIG. 6 is section taken in the plane including line 6—6 of FIG. 5 showing parallel legs of the clip parts locked in a selected position of lengthwise adjustment.

Means, indicated generally at 67, maintains the leg 37 of the second clip part 5 in longitudinal alignment with the leg 29 of the first clip part 3 as the leg of the second clip part is slidably adjusted relative to the leg of the first clip part. As seen in FIG. 6, alignment means 67 comprises a pair of parallel flanges 69 extending generally inwardly, with respect to the middle portion 9 of the first clip part 3, from opposite (upper and lower) sides of the leg of the second clip part 5. The flanges 69 define a guideway 70 (FIG. 7) between them for receiving the leg 29 of the first clip part 3 to guide the leg of the first clip part lengthwise of the leg 37 of the second clip part 5.

The leg 37 of the second clip part 5 is locked in a selected position of lengthwise adjustment relative to the leg 29 of the first clip part 3 by cooperable detent means generally indicated at 73. The cooperable detent means 73 includes a series of saw-toothed notches 75 at spaced intervals along the opposing (upper and lower) edges of the leg 29 of the first clip part 3. Each notch 75 corresponds to a position of lengthwise adjustment of the leg 37 of the second clip part 5 relative to the leg 29 of the first clip part 3. The cooperable detent means 73 further includes a pair of detents, each consisting of a relatively short protuberance 77 integrally formed with the leg 37 of the second clip part 5 and projecting inwardly toward the leg 29 of the first clip part 3 from a respective opposing (upper or lower) side of the leg 37. The protuberances 77 are receivable in a selected notch 75 to lock the legs 29, 37 against longitudinal movement relative to one another.

The guideway 70 prevents the legs 29, 37 from twisting in their respective planes relative to each other as they are adjusted so that the protuberances 77 are always received in respective notches 75 which are vertically aligned for maintaining the electrical box B in substantially vertical orientation. Prior mounting clips lack the guideway 70 of the mounting clip 1 of this invention and are therefore subject to having their detents received in vertically nonaligned notches during adjustment of the mounting clip so that a plane including the front edges E of the electrical box B is skewed with respect to the vertical. In that event, the front edges E of the electrical box B are not parallel with the front of the opening in the drywall, making proper attachment of a cover plate P by mounting screws M received through holes in lugs G of the electrical box B difficult or impossible. However the guideway 70 of the present invention assures proper alignment of the legs 29, 37 so that the plane including the front edges E of the electrical box B is maintained parallel with the drywall without the exercise of special care on the part of a person adjusting the mounting clip 1.

Figure 7:
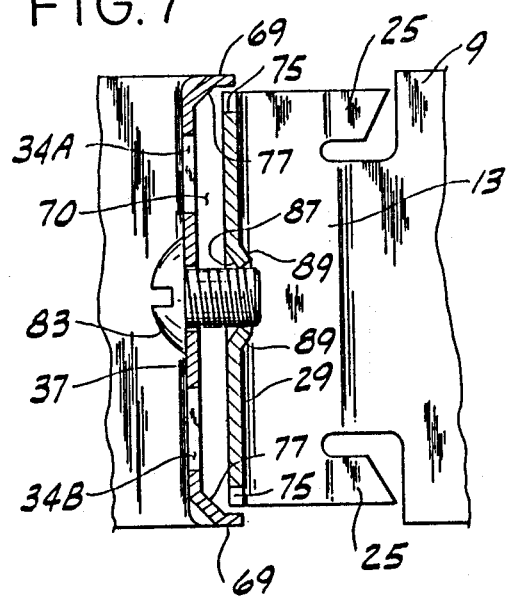
FIG. 7 is an enlarged fragmentary view of the clip of FIG. 6 showing the legs pulled apart for lengthwise adjustment of the legs.

Fastener means, constituting a screw fastener 83 in this embodiment, holds the first and second clip parts 3, 5 in assembly. The screw 83 is received through a slot 85 in the leg 37 of the second clip part 5, which extends lengthwise of the leg 37, and through an opening 87 in the leg 29 of the first clip part 3. The opening 87 is formed with a thread 89 for engaging the thread of the screw 83. As shown in FIG. 6, the screw 83, when tightened, holds the protuberances 77 in the selected notches 75 so that the legs 29, 37 may not slide relative to each other, thus fixing the selected relative lengthwise position of the legs. The screw 83 may be loosened so that the legs 29, 37 can be pulled apart a relatively short distance sufficient for withdrawl of the short protuberances 77 from their selected notches 75 so that the leg 37 of the second clip part 5 can be slidably adjusted relative to the first clip part 3 (FIG. 7). Although the legs are pulled apart, the leg 29 of the first clip part 3 remains in the guideway 70 of the leg 37 of the second clip part 5 so that the legs cannot be twisted out of lengthwise alignment during adjustment. The screw 83 may then be retightened to draw the legs 29, 37 together, as shown in FIG. 6, for insertion of the protuberances 77 into the newly selected notches 75 to lock the legs in a newly selected position of adjustment. The mounting clip 1 is easily and accurately manipulated because the clip parts 3,5 remain assembled during adjustment so that the clip parts do not have to be held together by hand as they are being adjusted. It is to be understood that a permanent fastener may be applied to hold the legs 29, 37 clip parts 3, 5 in a fixed, unalterable relative position such as when it is known that a large number of mounting clips are to be used with drywall of a single thickness.

As shown in FIG. 3, a plurality of markings, generally indicated at 91, are spaced at lengthwise intervals along upper and lower sides of the leg 29 of the first clip part 3. The markings 91 are each adjacent a respective notch 75 on the leg, thus corresponding to a selected relative longitudinal position of the legs 29, 37 and to a position of the electrical box B relative the front of the opening 0 in the drywall D. In this embodiment, the markings 91 are fractions of inches corresponding to the thickness of drywall being used. The markings 91 include two sets 91A, 91B of markings each adjacent a respective (upper or lower) side of the leg 29 of the first clip part 3. The longitudinal spacing of the upper set of markings 91A is staggered relative to the lower set of markings 91B such that no marking of the upper set of markings is vertically aligned with a marking of the lower set of markings. When the mounting clip is assembled, the markings 91 appear on the outwardly facing surface of the leg 29.

The leg 37 of the second clip part 5 covers the marking 91 on the leg 29 of the first clip part 3. However, as illustrated in FIG. 4, the second clip part 5 has two windows 93A, 93B constituting window means, adjacent opposite (upper and lower) sides of its leg 37. The windows 93A, 93B are arranged such that the window adjacent the upper side of the leg 37 of the second clip part 5 is vertically aligned with the window adjacent the lower side of the leg. As seen in FIG. 5, because of the relatively staggered spacing of the two sets of markings 91A, 91B and the vertical alignment of the windows 93A, 93B, for each position of adjustment of the legs 29, 37 relative to one another only one marking of the two sets of markings will be visible through a respective upper or lower window; and this marking will correspond to the thickness of drywall D being used. Since the markings 91 are visible from the outward side of the mounting clip 1, the adjustment for the thickness of the drywall may be made after the clip is mounted on the stud S. Further, because the head of the screw fastener 83 is located on the outside of the leg 37 of the second clip part 5, the selected marking (¾ inches as shown in FIG. 5) is visible while the screw is being tightened to fasten together clip parts 3, 5 in fixed relative lengthwise position. Thus the clip parts 3, 5 may be quickly and accurately adjusted to correspond to the thickness of the drywall D by loosening the screw 83, sliding the legs 29, 37 until the marking corresponding to the thickness of the drywall appears in either the upper or lower window 93A, 93B of the second clip part, and then tightening the screw.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A clip for mounting an object such as an electrical box on a metal stud of generally channel shape having a web, a pair of generally parallel flanges and inwardly turned lips on the flanges, said clip comprising a first clip engageable with the web of said stud and with one of said lips for securement of the clip to said stud, said first part having a relatively flat leg, a second clip part adapted to hold said object, said second clip part having a relatively flat leg extending in generally parallel face-to-face relation with the leg of the first clip part, the leg of the second clip part being slidable relative to the leg of the first clip part lengthwise of the leg of the first clip part thereby to adjust the position of the object being held by the second clip part relative to said stud, means for maintaining the leg of the second clip part in longitudinal alignment with the leg of the first clip part as the leg of the second clip part is slidably adjusted relative to the leg of the first clip part, and cooperable detent means on the legs of said first and second clip parts for locking the leg of the second clip part in selected positions of lengthwise adjustment relative to the leg of the first clip part.

2. A clip as set forth in claim 1 wherein said means for maintaining the leg of the second clip part in longitudinal alignment with the leg of the first clip part comprises flange means on the leg of one clip part defining a guideway for receiving the leg of the other clip part and for guiding the leg of said other clip part lengthwise of the leg of said one clip part.

3. A clip as set forth in claim 1 wherein the leg of each clip part has opposite side edges extending lengthwise of the leg, said cooperable detent means comprising a series of notches at spaced intervals along at least one side edge of one leg, each notch corresponding to a position of lengthwise adjustment of the leg of the second clip part relative to the leg of the first clip part, and at least one detent integrally formed with the other leg and receivable in a selected notch to lock said legs against longitudinal movement relative to one another.

4. A clip for mounting an object such as an electrical box on a metal stud of generally channel shape having a web and a pair of generally parallel flanges, said clip comprising a first clip part engageable with said stud for securement of the clip to said stud, said first part having a relatively flat leg, a second clip part adapted to hold said object, said second clip part having a relatively flat leg extending in generally parallel face-to-face relation with the leg of the first clip part, the leg of the second clip part being slidable relative to the leg of the first clip part lengthwise of the leg of the first clip part thereby to adjust the position of the object being held by the second clip part relative to said stud, a pair of flanges along opposite sides of the leg of the second clip part defining a guideway for receiving the leg of the first clip part and for guiding the leg of the second clip part lengthwise of the leg of the first clip part for maintaining the leg of the second clip part in longitudinal alignment with the leg of the first clip part as the leg of the second clip part is slidably adjusted relative to the leg of the first clip part, cooperable detent means on the legs of said first and second clip parts for locking the leg of the second clip part in selected positions of lengthwise adjustment relative to the leg of the first clip part.

5. A clip for mounting an object such as an electrical box on a metal stud of generally channel shape having a web and a pair of generally parallel flanges, said clip comprising a first clip part engageable with said stud for securement of the clip to said stud, said first part having a relatively flat leg, a second clip part adapted to hold said object, said second clip part having a relatively flat leg extending in generally parallel face-to-face relation with the leg of the first clip part, the leg of the second clip part being slidable relative to the leg of the first clip part lengthwise of the leg of the first clip part thereby to adjust the position of the object being held by the second clip part relative to said stud, means for maintaining the leg of the second clip part in longitudinal alignment with the leg of the first clip part as the leg of the second clip part is slidably adjusted relative to the leg of the first clip part, cooperable detent means on the legs of said first and second clip parts for locking the leg of the second clip part in selected positions of lengthwise adjustment relative to the leg of the first clip part, the leg of each clip part having opposite side edges extending lengthwise of the leg, said cooperable detent means comprising a series of saw-tooth notches at spaced intervals along at least one side edge of one leg, each notch corresponding to a position of lengthwise adjustment of the leg of the second clip part relative to the leg of the first clip part, and at least one detent on the other leg receivable in a selected notch to lock said legs against longitudinal movement relative to one another, said detent comprising a relatively short protuberance integrally formed with said other leg and receivable in a selected saw-tooth notch, and fastener means for holding said first and second clip parts in assembly, said fastener means being adapted to be loosened to permit said legs to be pulled apart a relatively short distance sufficient for withdrawal of said relatively short protuberance from a selected notch thereby to allow the leg of the second clip part to be slidably adjusted relative to the leg of the first clip part, and tightened to draw the legs together for insertion of said relatively short protuberance into a selected notch to lock the legs in a selected position of adjustment.

6. A clip for mounting an object such as an electrical box on a metal stud of generally channel shape having a web and a pair of generally parallel flanges, said clip comprising a first clip part engageable with said stud for securement of the clip to the stud, said first part having a relatively flat leg, a second clip part adapted to hold said object, said second clip part having a relatively flat leg extending in generally parallel face-to-face relation with the leg of the first clip part, the leg of the second clip part being slidable relative to the leg of the first clip part lengthwise of the leg of the first clip part thereby to adjust the position of the object being held by the second clip part relative to said stud, means for maintaining the leg of the second clip part in longitudinal alignment with the leg of the first clip part as the leg of the second clip part is slidably adjusted relative to the leg of the first clip part, cooperable detent means on the legs of said first and second clip parts for locking the leg of the second clip part in selected positions of lengthwise adjustment relative to the leg of the first clip part, and a plurality of markings spaced at intervals along the leg of said first clip part, each marking corresponding to a position of said object, and window means in the leg of the second clip part, said window means being so sized and positioned relative to said markings that, when the leg of the second clip part is in a position of adjustment relative to the leg of the first clip part, the only marking visible through said window means is a marking corresponding to a single position of the object.

7. A clip as set forth in claim 6 wherein said markings comprise two sets of markings along the leg of the first clip part adjacent opposite sides of the leg, said window means comprising two openings in said second leg adjacent opposite sides of the leg, said openings and said markings being so arranged that for each position of adjustment of the legs relative to one another, only one marking of the two sets of markings is visible through a respective opening.

8. A clip as set forth in claim 6 wherein the leg of said first clip part is of substantially uniform width along substantially its entire length.

* * * * *

UNITED STATES PATENT AND TRADEMARK OFFICE
CERTIFICATE OF CORRECTION

PATENT NO. : 4,971,280

DATED : November 20. 1990

INVENTOR(S) : Eric R. Rinderer

It is certified that error appears in the above-identified patent and that said Letters Patent is hereby corrected as shown below:

Column 6, claim 1, line 5, "clip engageable", should read ---clip part engageable---.

Signed and Sealed this

Twenty-eighth Day of July, 1992

Attest:

DOUGLAS B. COMER

Attesting Officer   Acting Commissioner of Patents and Trademarks